United States Patent

Minamikawa et al.

[11] Patent Number: 4,877,970
[45] Date of Patent: Oct. 31, 1989

[54] PROCESS FOR MEASURING CONTOUR CONFIGURATIONS OF ARTICLES DEFINED BY NUMEROUS CYLINDRICAL SURFACE PORTIONS

[75] Inventors: Masayasu Minamikawa; Yoshiaki Onabe; Masanao Ono, all of Nagoya, Japan

[73] Assignee: NGK Insulators, Ltd., Nagoya, Japan

[21] Appl. No.: 243,998

[22] Filed: Sep. 13, 1988

[30] Foreign Application Priority Data

Sep. 17, 1987 [JP] Japan ................................. 62-233574

[51] Int. Cl.$^4$ ............................................. G01N 21/86
[52] U.S. Cl. ..................................... 250/560; 356/376
[58] Field of Search ................. 250/560; 356/376, 386, 356/387, 394, 398

[56] References Cited

U.S. PATENT DOCUMENTS

| | | | |
|---|---|---|---|
| 3,566,135 | 2/1971 | Mouchart | 356/383 |
| 3,907,438 | 9/1975 | Holeman | 356/360 |
| 4,064,534 | 12/1977 | Chen et al. | 250/560 |
| 4,122,525 | 10/1978 | Eaton | 356/387 |
| 4,297,034 | 10/1981 | Ito et al. | 356/394 |
| 4,298,285 | 11/1981 | Ito | 356/394 |

Primary Examiner—David C. Nelms
Assistant Examiner—Eric F. Chatmon
Attorney, Agent, or Firm—Arnold, White & Durkee

[57] ABSTRACT

A process for measuring the contour configuration of an article defined by numerous cylindrical surface portions, is disclosed, which process comprises placing the article on a turntable, irradiating parallel light beams upon one side portion of the article while rotating the turntable, detecting changes, as a function $L(\theta)$ by means of a light-receiving member, in locations L at which the parallel light beams are interrupted by the article, said $\theta$ denoting a rotational angle of the turntable, inputting data of $L(\theta)$ thus detected into a memory of a computer, calculating a value of $L(\theta)+L(\theta 180°)$, comparing the thus calculated value with that for an ideal contour configuration, and correcting deviations in a position and angle of the article. Thereby, a correct measured value is obtained.

2 Claims, 7 Drawing Sheets

FIG_2

FIG_3

FIG_4

FIG_5

FIG_6

PROCESS FOR MEASURING CONTOUR CONFIGURATIONS OF ARTICLES DEFINED BY NUMEROUS CYLINDRICAL SURFACE PORTIONS

BACKGROUND OF THE INVENTION (1) Field of the Invention

The present invention relates to an improvement of a process for measuring the contour configurations of articles which configurations are each defined by numerous cylindrical surface portions, such as a honeycomb structural bodies which have an ununiform cylindrical outer surface and are used in purifiers for waste gases from automobiles.

(2) Related Art Statement

In general, honeycomb structural bodies to be used as catalyst carriers for the purification of waste gases from automobiles are conventionally of cylindrical shapes or of elliptically cylindrical shapes. However, honeycomb structural bodies having ununiform cylindrical outer surfaces constituted by numerous different cylindrical surface portions as shown in FIG. 1 have recently come to be used. Since such honeycomb structural bodies need to accurately be set inside their casings, it is necessary to precisely measure the contour configurations thereof.

In order to measure the contour configurations of these honeycomb structural bodies, limit gauges having a size equal to an ideal contour configuration plus an allowable dimensional tolerance are generally used, and whether or not the contour configuration of the honeycomb structural bodies is good or to be rejected is judged based on whether they pass the limit gauge or not. However, since such a contact type measuring process may damage surfaces of thin wall products, such as honeycomb structural bodies, this process is not favorable.

Under the circumstances, as shown in U.S. Pat. No. 4,298,285, DE No. 2,926,140C and GB No. 2,030,286B, NGK Insulators, Ltd. has already developed an apparatus for measuring the contour configuration of honeycomb structural bodies. That is, as shown in FIGS. 7 and 8, the apparatus for measuring the contour configuration of articles comprises a turntable 6 on which an article 5 to be measured is to be placed and which is rotated around a rotary shaft 8 by a motor 9 through a gear mechanism 10, a detector 11 for detecting the rotational angle of the turntable to produce a rotational angle signal, an edge detector including a parallel light-projecting member 12 for projecting parallel light beams onto the article, a parallel light-receiving member 13 for receiving a part of the parallel light which is not shielded or cut by the article to produce an edge position signal, a memory 16 for storing a standard edge position signal which corresponds to a standard article having a given contour configuration, and an operation circuit 15 for receiving the rotational angle signal. The parallel light-projecting and -receiving members are arranged on opposite sides of the turntable. The edge position signal and the standard edge position signal produce a signal which represents the deviation in the contour configuration of the article to be measured from the standard article. Reference numerals 11 and 17 denote a rotary endode and an operation circuit 15, respectively. The article is guided on the turntable by a guide plate 7. However, since this conventional apparatus is directed to cylindrical or elliptically cylindrical articles, the apparatus requires that the central point of the cylindrical or elliptically cylindrical surface constituting the outer periphery is present on an X-axis or a Y-axis. Therefore, this apparatus cannot unfavorably perform accurate measurement of articles having some of center points $O_1$ to $O_7$ deviated from the X-axis and the Y-axis as shown in FIG. 3. That is, according to the above prior art technique, a rotational angle of the turntable at which a curve of the parallel beam-interrupted location exhibits a peak is obtained when the turntable is rotated, and deviation in a set angle of the article on the turntable is corrected. As to the article having a shape shown in FIG. 1, the curve gently changes, so that the location of the peak cannot accurately be read.

SUMMARY OF THE INVENTION

It is an object of the present invention to obviate the problems possessed by the above prior art, and the invention has been accomplished to provide a process for enabling accurate measurement of contour configurations of articles defined by numerous cylindrical surfaces in which central points of the cylindrical surfaces are deviated from a X-axis and a Y-axis.

According to the process of the present invention, parallel light beams are irradiated upon one side of an article which is placed on a turntable and is defined by numerous cylindrical surface portions, and changes in a location L at which the parallel light beams are interrupted with the article is detected by a light-receiving member as a function $L(\theta)$ in which $\theta$ is a rotational angle of the turntable, while the article is being rotated. The thus detected data are inputted in a memory of a computer in which $L(\theta)+L(\theta+180°)$ is calculated, and deviations of the location and the angle of the article on the turntable are corrected by comparing the thus calculated values with those of an ideal contour configuration of the article. Thereby, correct measurement values of the contour configuration of the article can be obtained.

According to the present invention, a peak value and an angle ($\theta$) of the turntable exhibiting the peak value are not directly determined based on changes in the location $L(\theta)$ at which the parallel light beams are interrupted with the side portion of the article placed on the turntable under rotation, but the peak value and the angle ($\theta$) are read based on sums of the light beam-interrupted location $L(\theta)$+the light beam-interrupted location $L(\theta+180°)$ which is deviated from L by 180°, that is, a value of $[L(\theta)+L(\theta+180°)]$. Therefore, as shown in Examples mentioned later, a curve having a sharp peak can be obtained for the article defined by numerous cylindrical surface portions shown in FIG. 3. Thus, according to the present invention, deviations in the location and the angle of the article relative to the turntable inevitably occurring when the former is placed onto the latter can accurately be detected and then corrected, thereby enabling extremely precise measurement of the contour configuration thereof.

These and other objects, features, and advantages of the invention will be appreciated upon reading of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made of the attached drawings, wherein.

DETAILED DESCRIPTION OF THE INVENTION

Now, the present invention will be explained in more detail with reference to the attached drawings.

Figure 3:
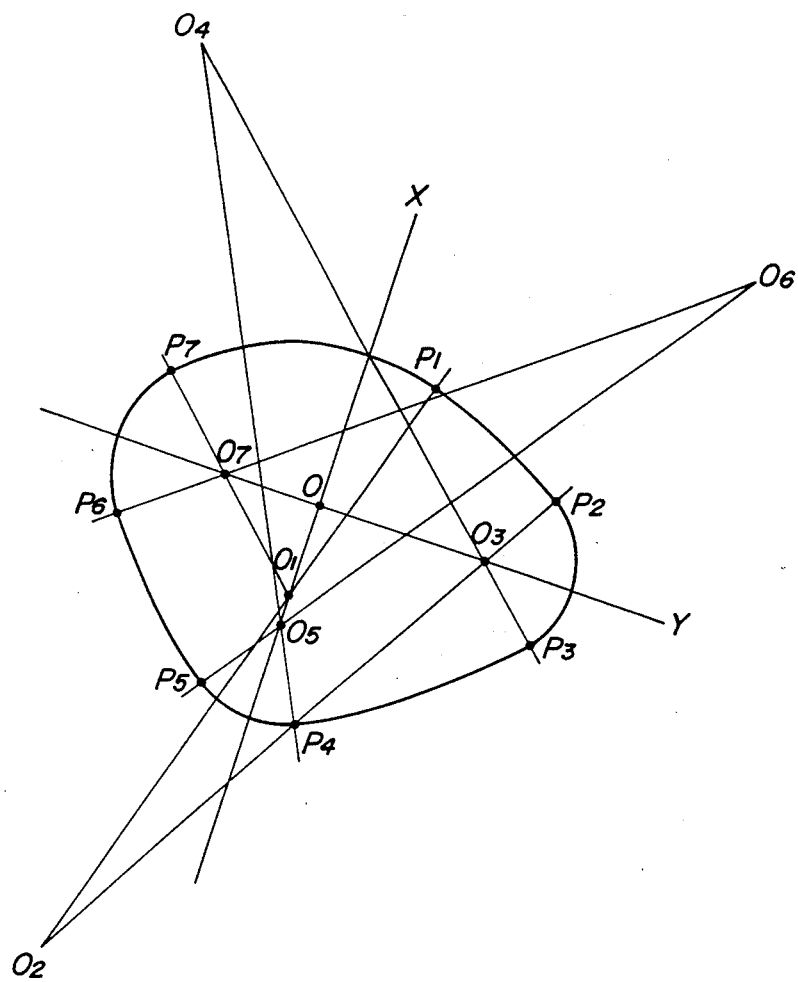
FIG. 3 is a plan view illustrating the contour configuration of an article by way of example.

First, before entering the detailed explanation, variables for representing the contour configuration of the article shown in FIG. 3 will be defined.

As shown in FIG. 3, center points of cylindrical surface portions are denoted by $O_1$, $O_2$, ..., and $O_7$, respectively, and a Y-axis is taken in a direction of the maximum length of the article, while an X-axis is taken in a direction orthogonal thereto. FIG. 3 shows the article defined by the seven cylindrical surface portions, and the Y-axis is a straight line passing through $O_3$ and $O_7$. As a matter of course, it goes without saying that the number of center points and the directions of the Y-axis and the X-axis vary depending upon articles in concern. However, since the contour configuration of articles in which the number of center points is 4 or less can be measured by the conventional technique at the same measuring accuracy as that in the present invention, the present invention is mainly directed to articles having five or more center points as its objects to be measured.

Figure 4:
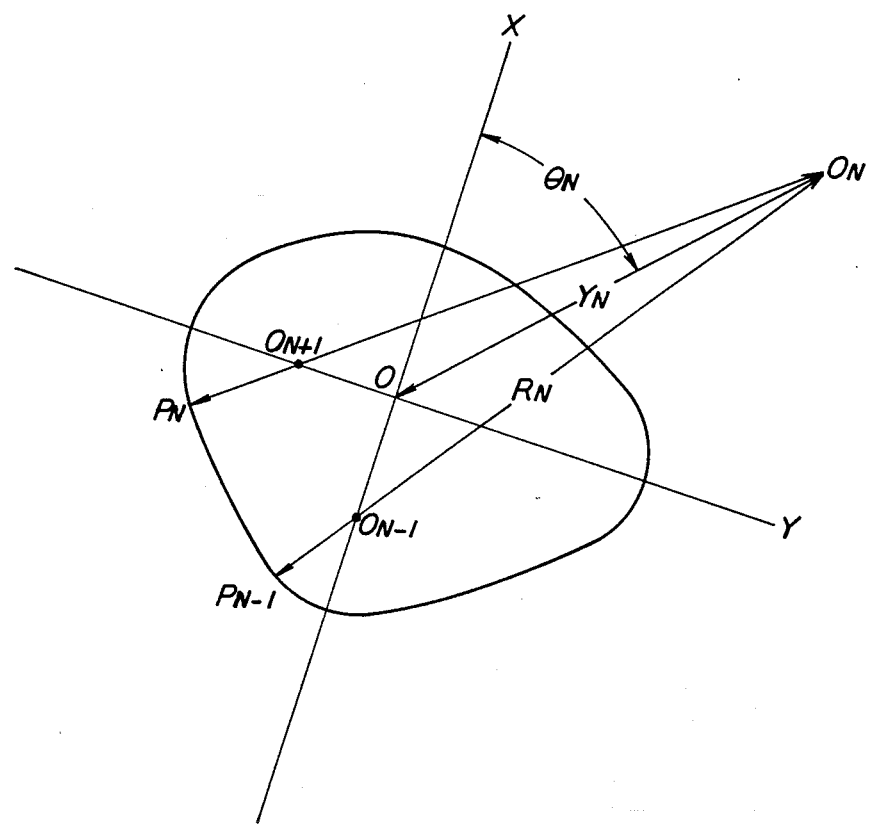
FIGS. 4 and 5 are plan views illustrating variables representing the contour configuration of the article.
Figure 5:
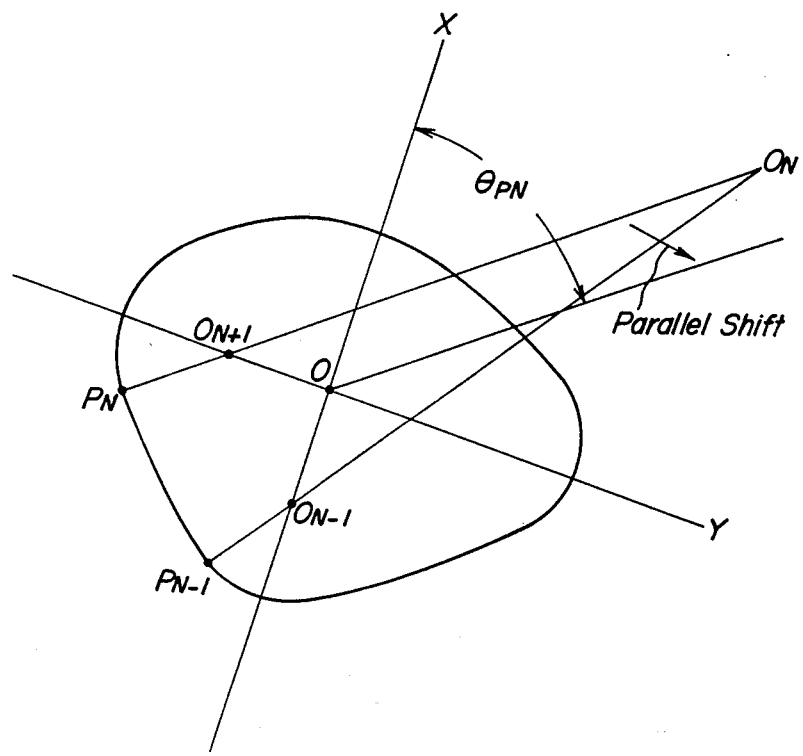

As shown in FIG. 4, assume that a distance between a center point $O_N$ and the origin O of the coordinate axes X and Y, and an angle of a segment O–$O_N$ clockwise measured starting from the X-axis are taken as $Y_N$ and $\theta_N$, respectively, while a radius of curvature of a cylindrical surface portion depicted around the center point $O_N$, and a contact point between the cylindrical surface portion and that succeedingly adjacent thereto are taken as $R_N$, and $P_N$, respectively. Since the adjacent cylindrical surface portions smoothly continue to each other, as shown in FIG. 5, a point of inflection, $P_N$ is positioned on a straight line passing through the center point $O_N$ and a center point $O_{N+1}$. This straight line is shifted in parallel to pass the origin of the co-ordinate axes X and Y, and an angle between the thus shifted straight line and the X-axis is denoted by an inflected angle $\theta_{PN}$.

Figure 1:
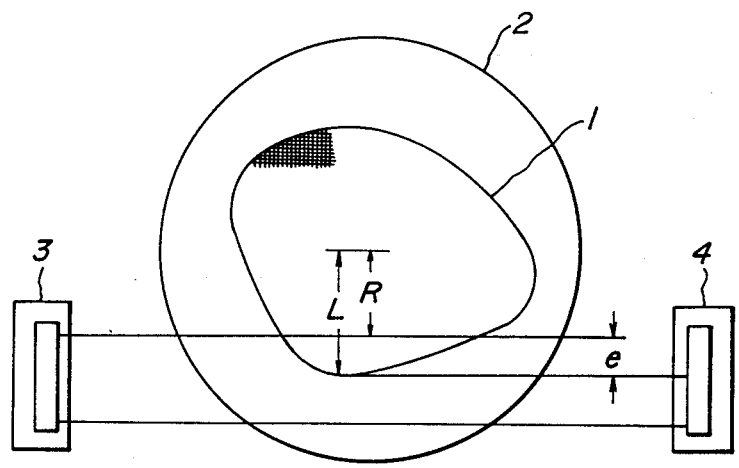
FIG. 1 is a plan view of a measuring principle according to the present invention.

In the present invention, as shown in FIG. 1, an article 1 denoted by numerous cylindrical surface portions as mentioned above is set on a turntable 2, and parallel light beams such as laser light beams are irradiated upon one side portion of the article 1 from a light-projecting member 3 while the article is being rotated. A width "e" in which the parallel light beams are interrupted with the side portion of the article is measured by a light-receiving member 4, and a sum of this width "e" and a preliminarily accurately measured distance R from the rotary center of the turntable 2 to a nearer side of a passage of the parallel light beams is taken as "L". The L value gives a function L ($\theta$) in which $\theta$ is a rotary angle of the turntable 2. If the article 1 has an ideal shape.

$$L(\theta) = R_N + Y_N \cdot \cos(\theta_N - \theta)$$

Since the value of N varies every time when $\theta$ exceeds the above-mentioned angle of inflection, $\theta_{PN}$, values of $R_N$, $Y_N$ and $\theta_N$ vary as follows:

when $0 \leq \theta \leq \theta_{P1}$, $L(\theta) = R_1 + Y_1 \cdot \cos(\theta_1 - \theta)$, and when $\theta_{P1} < \theta \leq \theta_{P2}$, $L(\theta) = R_2 + Y_2 \cdot \cos(\theta_2 - \theta)$.

Figure 2:
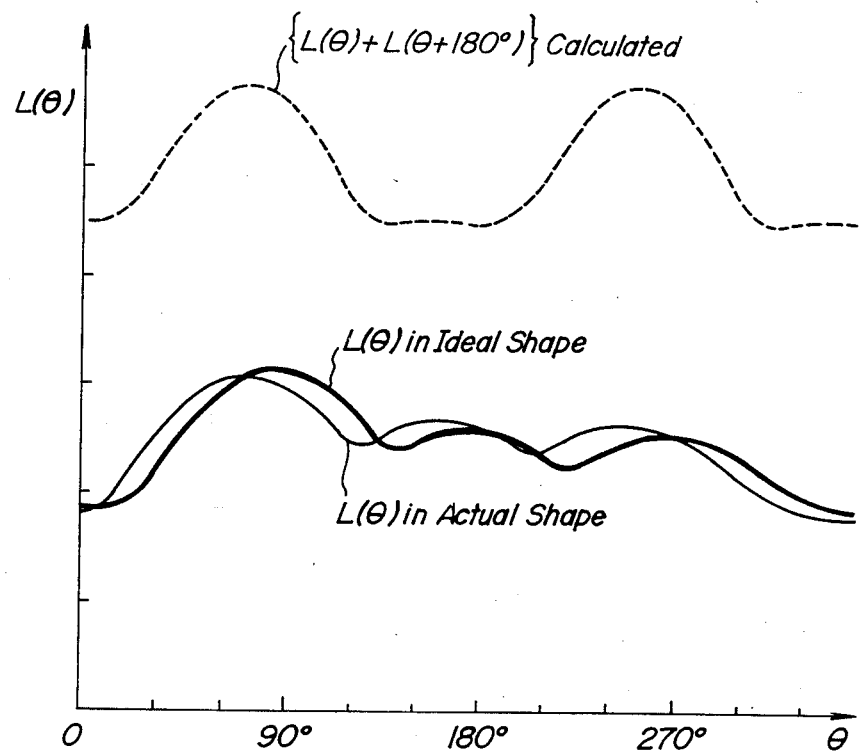
FIG. 2 is a graph of L ($\theta$) measured.

Values of L ($\theta$) obtained in the above calculations are shown by a thick line over a range of $0° \leq \theta 360°$ in FIG. 2.

Figure 6:
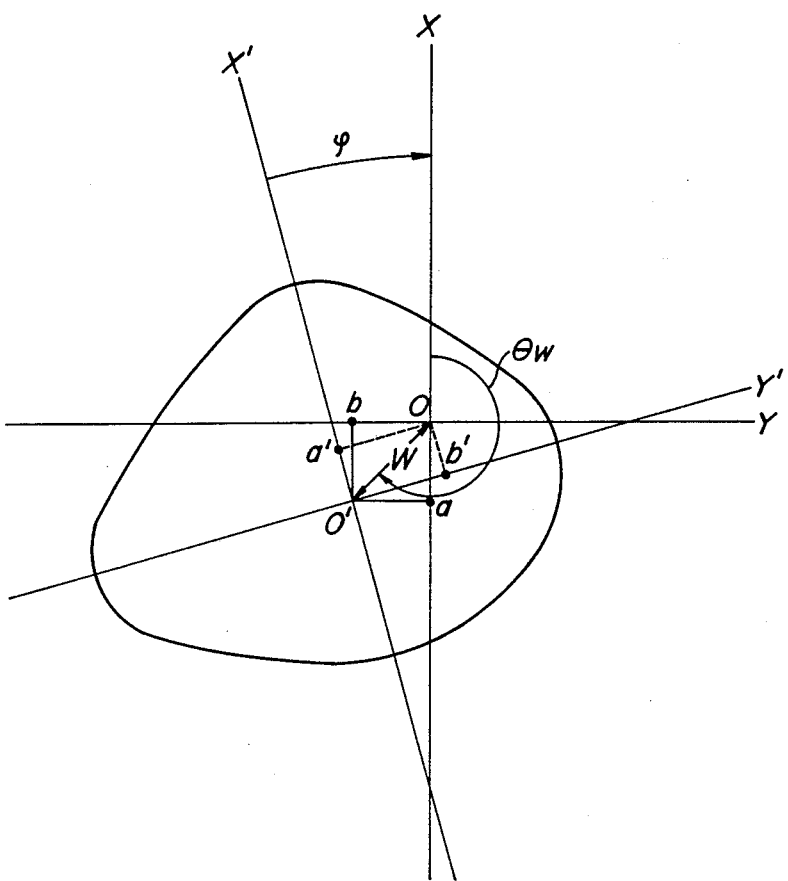
FIG. 6 is a plan view illustrating the relationship between a twisted angle $\phi$ and a deviation of a center (W, $\theta_w$)
Figure 7:
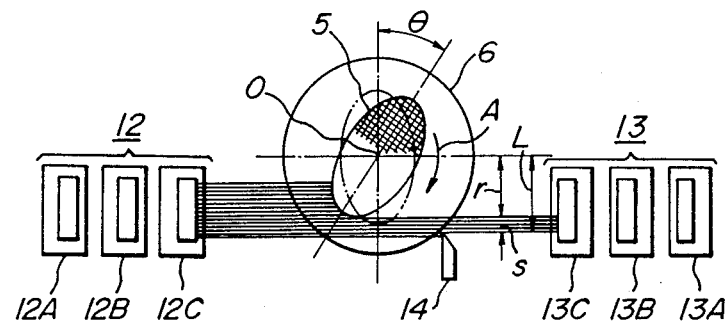
FIG. 7 is a schematic plan view of a conventional apparatus.
Figure 8:
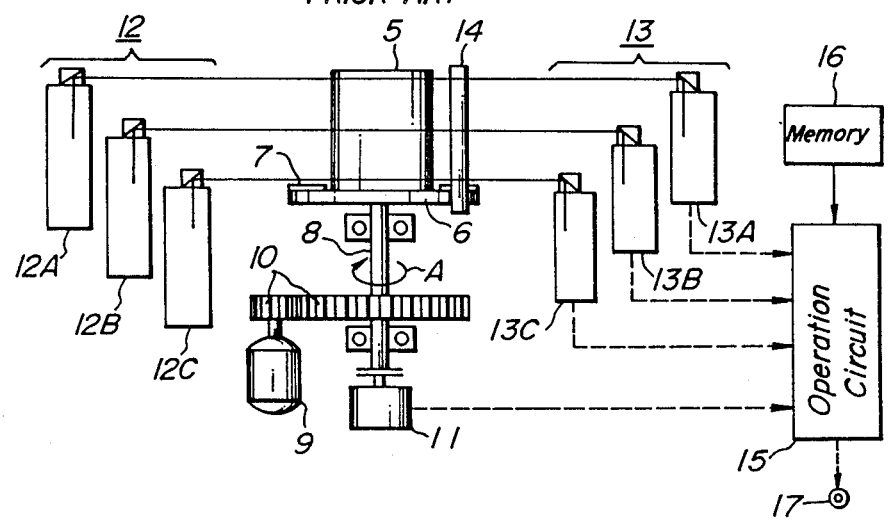
FIG. 8 is a schematic side view of the apparatus shown in FIG. 7.

However, when the counter configuration of the article is actually measured, it is inevitable that the center O' of the article shifts from the center O of the turntable as shown in FIG. 6, and the coordinate is twisted by an angle $\phi$. For this reason, values of L ($\theta$) actually measured vary as shown by a thin line in FIG. 2. Accordingly, deviations in the center point and the angle are corrected by using a peak value of L ($\theta$) and a value of $\theta$ at that time. The curve of L ($\theta$) in the case of such an article is relatively gentle as in FIG. 2, so that it is difficult to accurately read the value of $\theta$ exhibiting the peak.

In the present invention, in order to obviate such a drawback, the data of L ($\theta$) are fed into a memory of a computer in which a value of L ($\theta$)+L($\theta$+180°) is obtained by adding a value of L($\theta$+180°) to L($\theta$). As a result, a curve having relatively sharp peaks as shown in FIG. 2 can be obtained. Thus, the location and the angle of the article on the turntable are corrected based on this calculation value.

In order to obtain the twisted angle ($\phi$), a first regression equation $y_1$ and a second regression equation $y_2$ are determined from data of L($\theta$) near $\theta = 90°$ and $\theta = 270°$, for instance, at thirteen points every 1° in a range of 13° therearound, respectively.

$$y_1(\theta) = a_1\theta^2 + b_1\theta + c_1$$

$$y_2(\theta) = a_2\theta^2 + b_2\theta + c_2$$

Then, $Y(\theta) = y_1(\theta) + y_2(\theta + 180°)$ is obtained by the above-mentioned addition, and differentiated by $\theta$ to obtain $dY(\theta)/d\theta = d\{y_1(\theta) + y_2(\theta + 180°)\}/d\theta$. Then, a value of $\theta$ when $dY(\theta)/d\theta = 0$, i.e., $\theta$max, is obtained, and a twisted angle $\phi$ is obtained by $\phi = \theta$max$-90°$.

Next, a deviation of the center of the article from that of the turntable is obtained by using polar co-ordinates (W, $\theta$w) as shown in FIG. 6. For this purpose, as in the determination of the twisted angle $\phi$, third and fourth regression equations $y_3$ and $y_4$ are determined based on data near $\theta = 90°$ and $\theta = 270°$, for instance at thirteen points every 1° in a range of 13° therearound, respectively.

$$y_3(\theta) = a_3\theta^2 + b_3\theta + c_3$$

$$Y_4(\theta) = a_4\theta^2 + b_4\theta + C_4$$

Next, based on these regression equations and differences in $L(\theta)$ between the actual contour configuration and the idea contour configuration of the article at $\theta = 0°$, $90°$, $180°$, and $270°$, values of a and b are determined as follows:

$$a = [\{y_2(180° - \theta) - L(180°)\} - \{y_1(\theta max) - L(90°)\}]/2$$

$$b = [\{y_4(270° - \theta) - L(270°)\} - \{Y_3(90° - \theta) - L(90°)\}]/2$$

The values of a and b are subjected to coordinate transformation by the following respective equations.

$$a = -(a \cos\phi + b \sin\phi)$$

$$b = -(b \cos\phi - a \sin\phi)$$

By using the thus obtained values of a and b, polar co-ordinates (W, $\theta w$) exhibiting deviations of the center of the article can accurately be determined as follows:

$$W = (a^2 + b^2)^{\frac{1}{2}}$$

$$\theta w = n\pi \pm \sin^{-1}(b/Y)$$

As mentioned above, according to the present invention, values of (W, $\theta w$) exhibiting twisting angles $\theta$ and deviations in the centers can accurately be determined by using the sum of $L(\theta)$ and $L(\theta + 180°)$. Therefore, inevitable occurrence of the deviations in the position and the angle when the article 1 is placed on the turntable 2 can precisely be corrected. Since the data of $L(\theta)$ which have been corrected in this way represent the contour configuration of the article in the standard state, how much the contour configuration of the article is deformed from the ideal one of the article can be determined by calculating difference between the ideal and actual contour configurations. When the deformed amount exceeds an acceptable value, the article is rejected as unacceptable.

As is clear from the above-mentioned explanation, according to the present invention, the contour configuration of the article defined by numerous cylindrical surface portions can be measured in a non-contact manner. Thus, the process according to the present invention is suitable for the measurement of the contour configurations of articles having a small wall thickness, such as honeycomb structural bodies. Further, in such a measurement, deviations in the center and the angle of the article relative to those of the turntable inevitably occur, but the peak value and the angle at that time can accurately be grasped and their deviations can be corrected based on calculation values of $L(\theta) + L(\theta + 180°)$ according to the present invention. Consequently, accurate measurement values can be obtained without being influenced by these deviations. Therefore, according to the present invention, how much the article to be measured is deformed from the ideal contour configuration can be grasped with accuracy. Accordingly, the present invention greatly contributes to industrial developments as a process for measuring the contours configurations of articles defined by numerous cylindrical surface portions while completely removing the problems possessed by the prior art.

What is claimed is:

1. A process for measuring the contour configuration of an article defined by numerous cylindrical surface portions, which process comprises placing the article on a turntable, irradiating parallel light beams upon one side portion of the article while rotating the turntable, detecting changes, as a function $L(\theta)$ by means of a light-receiving member, in locations L at which the parallel light beams are interrupted by the articles, said $\theta$ denoting a rotational angle of the turntable, inputting data of $L(\theta)$ thus detected into a memory of a computer, calculating a value of $L(\theta) + L(\theta + 180°)$, comparing the thus calculated value with that for an ideal contour configuration, and correcting deviations in a position and an angle of the article, whereby a correct measured value is obtained.

2. A measuring process accoridng to claim 1, wherein the article defined by the numerous cylindrical surface portions is a honeycomb structural body.

* * * * *